Patented Mar. 12, 1940

2,193,541

UNITED STATES PATENT OFFICE 2,193,541

PROCESS FOR PRODUCING FIRE EXTINGUISHING FOAM

Lewis G. Morris Timpson, Plainfield, N. J., assignor to Pyrene Minimax Corporation, Newark, N. J., a corporation of Delaware No Drawing. Application July 1, 1937, Serial No. 151,465

7 Claims. (Cl. 23—11)

This invention relates to the production of fire extinguishing foam and more particularly to foam stabilizing ingredients for use therein.

There are several known methods of producing fire extinguishing foam, each employing a foam stabilizing ingredient, but the requirements which must be met by the foam stabilizing ingredients vary with the particular process employed for producing foam. Where foam is produced by a chemical reaction of two substances to form a gas, it is possible to incorporate thoroughly the foam stabilizing agent with the resulting foam before discharging the foam from the apparatus.

In methods involving the aspiration of a gas into a stream of liquid, such as described in the Wagener Patent No. 1,821,914, however, the requirements which must be met by the foam stabilizing ingredients are more exacting. The foam stabilizing agent must perform its work in a very brief space of time and must be capable of forming a fairly concentrated solution. Moreover, the amount of the agent which can be aspirated or injected into a flowing stream of water is limited and, consequently, when these methods of introduction are relied upon the agent must be of such character that the resulting solution will contain sufficient stabilizing agent to form foam satisfactory for extinguishing a fire. In addition to the requirement for solubility and dispersibility in water, the stabilizing ingredient should be capable of producing a good quality of foam, that is, one with good body and able to stand up under adverse conditions. Such adverse conditions arise especially where the foam may be applied to oil or gasoline fires. In such use of fire extinguishing foam, it is very desirable to throw a blanket of foam on a surface of burning liquid of such a character that the foam will maintain its blanket form, excluding air from the hot liquid, until the liquid has been afforded a chance to cool. The hot vapors tend to deteriorate or break down most foam under such conditions.

An object of my invention is to provide a foam stabilizing ingredient fulfilling the foregoing requirements with the production of foam of superior qualities.

Another object of my invention is to provide a method of producing fire extinguishing foam according to the method described in the above mentioned Wagener patent, utilizing the foam stabilizing ingredients of this invention.

While the foam stabilizing ingredients of my invention are especially suited and particularly desirable for use in the Wagener method of producing fire extinguishing foam, the use thereof is not limited to this method and they may advantageously be employed in other methods of producing fire extinguishing foam.

I have discovered that a soluble phosphated salt of a fatty alcohol or of a fatty acid glyceride produces an unusually high quality of fire extinguishing foam, particularly with respect to the resistance of the foam to destruction by hot vapors. Such a phosphated salt containing a fatty acid radical should be readily soluble in water in order to afford a solution of the foam stabilizing ingredient of sufficient concentration so that when it is mixed with water in the proper proportions, the foam produced will be of fire extinguishing quality. For example, in a method of producing "air foam", that is by the Wagener process, in which the foam stabilizing solution is mixed with the water in the ratio of about 1 to 16, I have found that a 12% solution of a phosphated salt containing a fatty radical is suitable. Where the water and foam stabilizing solution are mixed in different proportions, the strength of the foam stabilizing solution may be suitably adjusted.

One class of ingredients which are particularly suitable for purposes of this invention is the phosphated inorganic sulfonates of a fatty alcohol. The fatty radical may be any of the well known fatty radicals such as the lauryl, cetyl, palmityl, capryl or myricyl radicals. For example, a phosphate modified sodium lauryl sulfonate or sulfate has been found to be particularly satisfactory when employed alone as a foam stabilizing ingredient for producing fire extinguishing foam. These phosphated fatty salts preferably contain an inorganic acid and basic radical and/or element, such as the alkaline materials sodium, potassium or ammonium, combined with an acidic radical such as the sulfonate, sulfate, chloride, or nitrate in order to render the material sufficiently soluble in water.

The foam stabilizing ingredient may be prepared in any desired manner as, for example, by combining a fatty alcohol or fatty acid glyceride with sodium acid sulfate, or by the formation of a fatty sulfonic acid or sulfate in some other manner. The fatty ester of an inorganic acid, or a mixture of such esters would then be phosphated in any suitable manner. Such phosphating might be carried out by a treatment with trisodium phosphate as is well understood in the art. My invention is not dependent on any particular procedure for preparing these foam stabilizing agents.

Various of these phosphated fatty salts may be employed, either alone or in combination with each other or with other foam stabilizing ingredients. When employed in combination with other foam stabilizing ingredients, these phosphated organic salts may be employed in smaller proportions but have the effect of greatly improving the character and quality of the foam, particularly as regards its stability in the presence of hot vapors.

The phosphated fatty materials of my invention may be employed in the pure form but for economic reasons are preferably of commercial purity. For example, the foam stabilizing ingredient may be prepared from a mixture of fatty alcohols or fatty acid glycerides. The material would thus be either a mixture of different salts or a compound salt containing a combination of different fatty radicals.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a method of producing fire extinguishing foam, the steps of forming foam by aspirating air into a stream of water, and incorporating in the foam a foam stabilizing agent comprising a soluble phosphated salt containing a fatty radical.

2. In a method of producing fire extinguishing foam, the steps of forming foam by aspirating air into a stream of water, and incorporating in the foam a foam stabilizing agent comprising a soluble phosphated inorganic salt of a fatty alcohol.

3. In a method of producing fire extinguishing foam, the steps of forming foam by aspirating air into a stream of water, and incorporating in the foam a foam stabilizing agent comprising a soluble phosphated inorganic salt of a fatty acid glyceride.

4. In a method of producing fire extinguishing foam, the steps of forming foam by aspirating air into a stream of water, and incorporating in the foam a foam stabilizing agent comprising a soluble phosphated sodium lauryl sulfate.

5. A process of producing fire extinguishing foam comprising introducing a foam stabilizing agent containing a soluble phosphated salt having a fatty radical into water, and incorporating a gas into a stream of said water by the aspiration action thereof.

6. A process of producing fire extinguishing foam comprising introducing a foam stabilizing agent containing a soluble phosphated inorganic salt having a fatty radical into water, and incorporating a gas into a stream of said water by the aspiration action thereof.

7. A process of producing fire extinguishing foam comprising introducing a foam stabilizing agent containing a soluble phosphated alkali sulfate of a fatty alcohol into water, and incorporating a gas into a stream of said water by the aspiration action thereof.

LEWIS G. MORRIS TIMPSON.